(12) United States Patent
Sanz et al.

(10) Patent No.: US 6,460,805 B1
(45) Date of Patent: Oct. 8, 2002

(54) DOUBLE CONVEX AIRCRAFT WINDOW

(75) Inventors: Eduardo Sanz, San Antonio; Gilbert Moreno, S. A., both of TX (US)

(73) Assignee: MSA Aircraft Products, Ltd., San Antonio, TX (US)

( * ) Notice: Subject to any disclaimer, the term of this patent is extended or adjusted under 35 U.S.C. 154(b) by 0 days.

(21) Appl. No.: 09/645,919

(22) Filed: Aug. 24, 2000

(51) Int. Cl.$^7$ ................................................. B64C 1/14

(52) U.S. Cl. ............................... 244/129.3; 244/129.1; 160/88

(58) Field of Search ........................ 244/129.3; 160/88, 160/107, 132, 84.02, 84.04

(56) References Cited

U.S. PATENT DOCUMENTS

| | | | | |
|---|---|---|---|---|
| 4,586,289 A | * | 5/1986 | Jaeger | 49/64 |
| 4,679,610 A | | 7/1987 | Spraggins | 160/107 |
| 5,467,943 A | * | 11/1995 | Umeda | 244/129.3 |
| 5,816,307 A | * | 10/1998 | Sanz | 160/84.04 |
| 6,070,639 A | * | 6/2000 | Winston et al. | 160/120 |
| 6,186,211 B1 | * | 2/2001 | Knowles | 160/84.02 |

\* cited by examiner

*Primary Examiner*—Michael J. Carone
*Assistant Examiner*—Gabriel S. Sukman
(74) *Attorney, Agent, or Firm*—Jackson Walker, L.L.P.

(57) ABSTRACT

A window apparatus for use within an aircraft interior. This window having at least one shade frame, at least one shade attached to the shade frame at its top and a moveable shade rail attached at its bottom, a first and second lens assembly where the first lens assembly has first lens and the second lens assembly has a second lens, the first and second lenses being mountable to the shade frame such that they form a double convex configuration, and means for moving the shade between a substantially open position and a substantially closed position.

The first and second lenses may have the same dimensions and/or be rectangular in shape. The first lens may have a length of at least 40 inches, a width of at least 30 inches, and an area of at least 1200 square inches. The shade may be pleated, tubular in shape, and have means for maintaining the horizontal alignment of the shade rail.

Means for moving the shade may include a left and right electrically driven motor wired in series to provide synchronized movement of the shade. These means may also include shade track channels to provide for lateral and vertical alignment for the shade with respect to the shade frame such that the shade is centered within the shade frame and switch means for controlling the operation of the left and right motors.

19 Claims, 11 Drawing Sheets

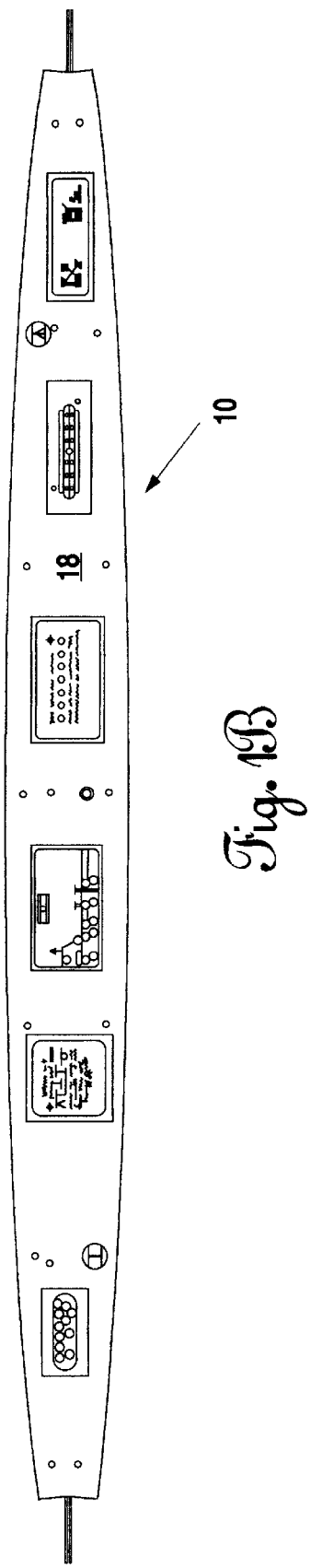
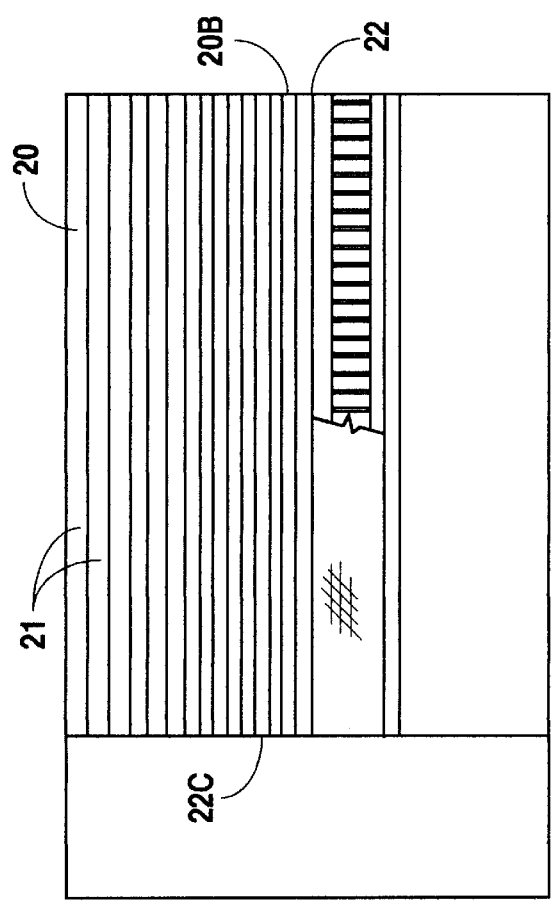
Fig. 1B
Fig. 1C

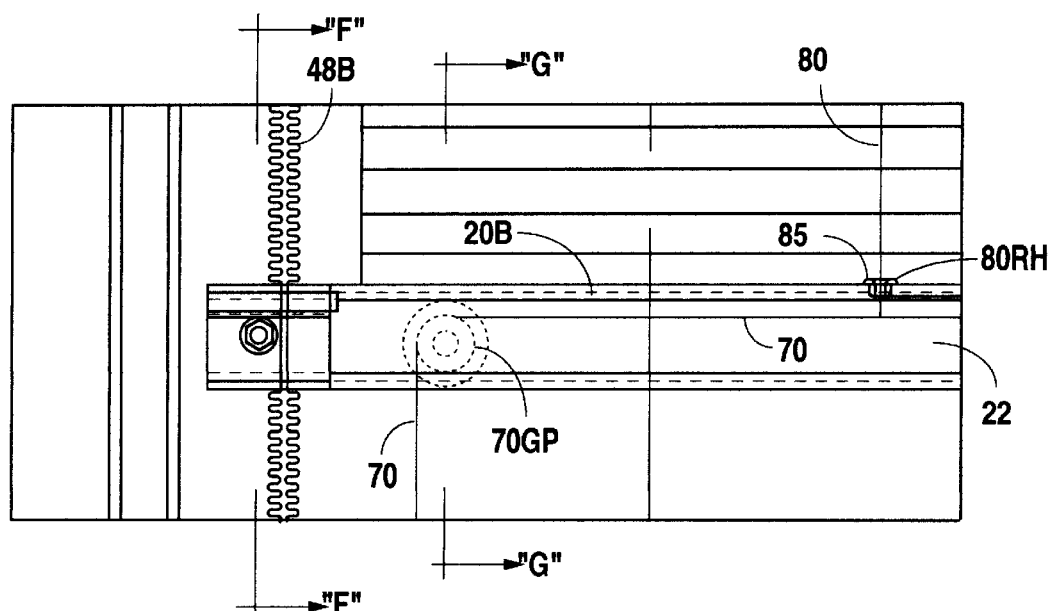
Fig. 6
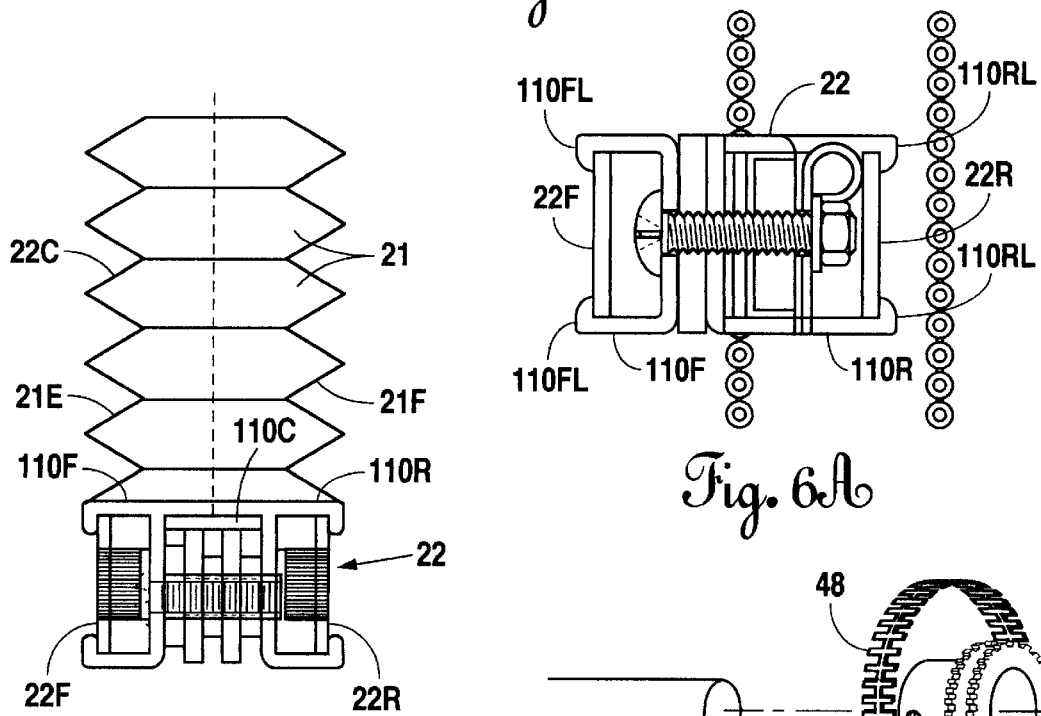
Fig. 6A
Fig. 6B
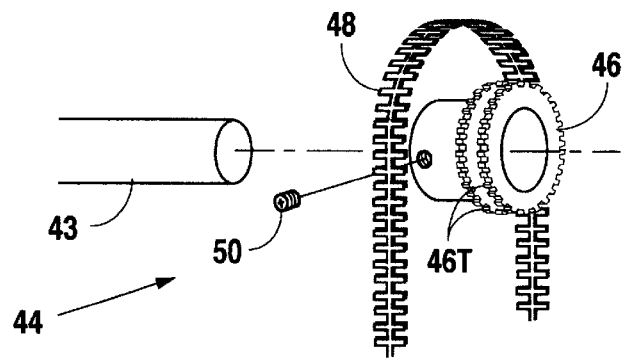
Fig. 7A

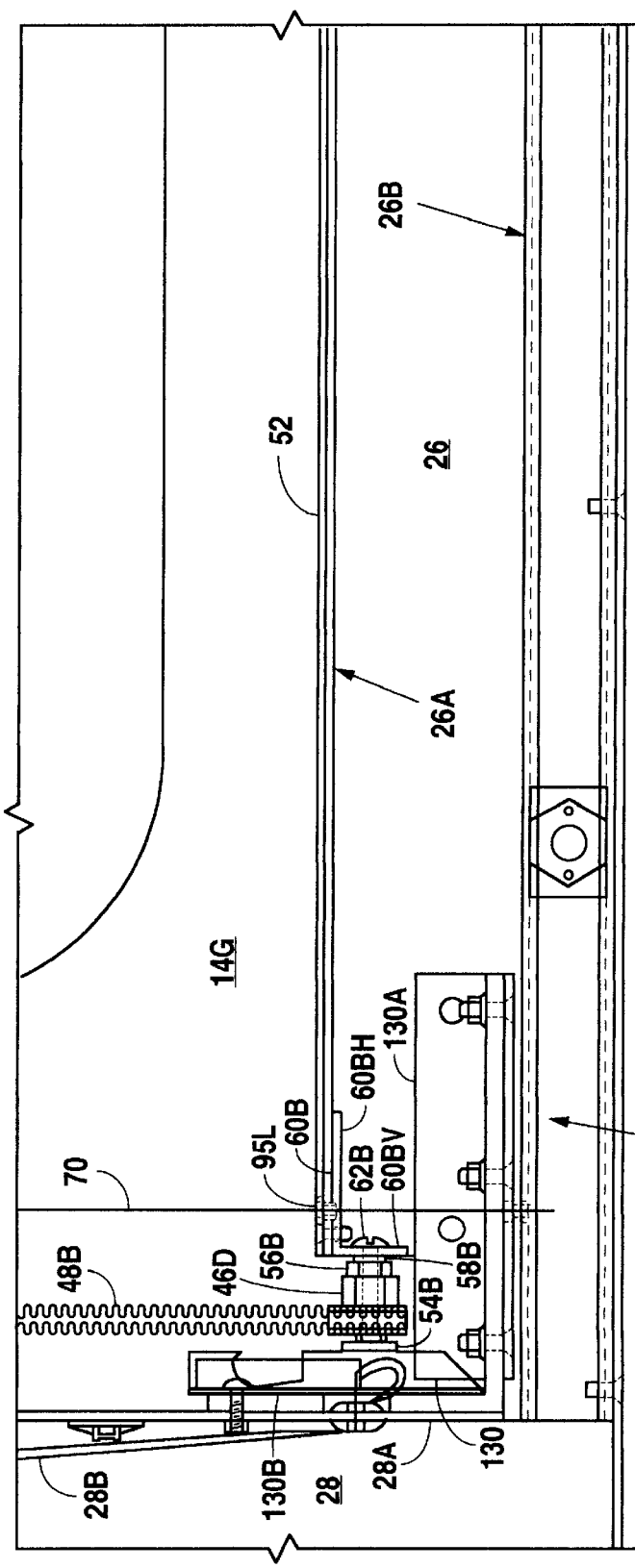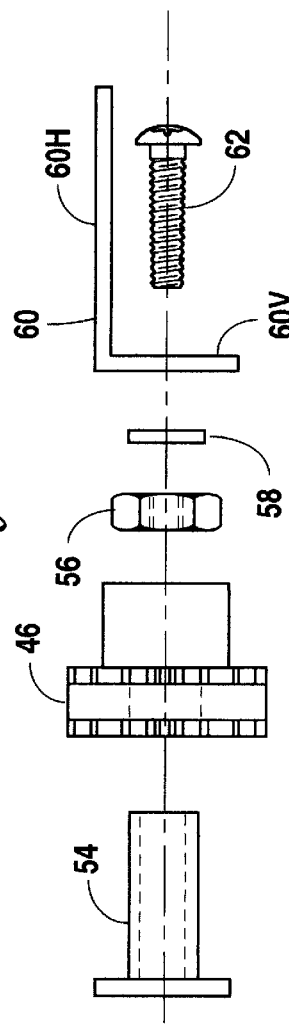

DOUBLE CONVEX AIRCRAFT WINDOW

BACKGROUND OF THE INVENTION

The present invention relates to a window apparatus, and more specifically to a modular window for use within aircraft interiors. The use of windows in both the interior and exterior (fuselage) of an aircraft is well known. Windows having a convex configuration are often inserted into the exterior walls (fuselage) of aircraft. Such windows are relatively small in size. These windows have a convex configuration in order to conform to the shape of the fuselage itself. The fuselage typically having a curved cylindrical shape to enhance the aircraft's flight.

The prior art teaches the use of a shade with the aircraft window to provide privacy or to shield occupants and/or cargo from sunlight. Shade assemblies which may be moved between a substantially open and a substantially closed position are well known. The shade may be moved manually or with the aid of a motorized assembly. Such a shade is illustrated by U.S. Pat. No. 4,679,610, the specifications and drawings of which are hereby incorporated by reference. Specifically, the '610 patent illustrates the use of a mechanical device for the movement of the shade between an open and closed position. The '610 patent illustrates the conventional "shade between the lenses design". This design has two transparent lenses, a shade, and a device to raise and lower the shade, all attached to a shade frame and placed within the partition.

Designers o f aircraft interiors sometimes require a window to be placed within the bulkheads or other interior walls of a aircraft. These bulkheads or other interior walls of an aircraft cabin are tabular or planar. Tabular or planar walls are not curved to conform to the shape of the aircraft's fuselage. Windows placed into such interior walls are typically larger than those placed within a fuselage wall. Placing windows on interior walls of an aircraft is common in custom built aircraft of the corporate jet size. Examples of corporate jets include those offered by Gulfstream, Cessna, and Boeing. Interior windows are often placed within partitions (interior walls) separating one cabin area from another. These partitions are typically located in their entirety within the aircraft interior.

These interior walls or partitions have a tabular configuration while the fuselage walls have a curved configuration so as to conform to the exterior shaping of the aircraft. In the past, tabular windows have been placed within these interior tabular partitions.

The use of tabular windows within interior partitions sometimes creates a problem. Unlike static structures which use tabular windows without difficulty, tabular windows mounted in aircraft interiors may result in undesirable flexing. When a tabular aircraft window exceeds certain dimensions, flexing or "oil canning" may occur across the broad expanse of the lens. Flexing can deter proper movement of the shade as well as create an unaesthetic appearance.

The present invention addresses this problem by rigidly mounting a pair of lenses in a double convex configuration. The lenses are mounted to the shade frame such that each lens is curved outwardly, extending away from the shade itself. The two lenses form a double convex configuration compact enough to be placed within a tabular shade frame capable of being mounted within an interior partition or wall.

SUMMARY OF THE INVENTION

Accordingly, the present invention provides a window for use within an aircraft interior partition that resists undesirable lens flexing due to having a pair of lenses rigidly mounted to a shade frame to form a double convex configuration.

BRIEF DESCRIPTION OF THE DRAWINGS

FIG. 1B is a top elevation view of the present invention.

FIG. 1C is an enlarged, elevation view of the present invention illustrating the left hand side of the shade frame.

FIG. 6 is a left side, enlarged, detailed, elevation view of the present invention illustrating the shade rail attachment to left chain.

FIG. 6A is a side, cross-sectional elevation view of the present invention, taken along line F—F of FIG. 6.

FIG. 6B is a side, cross-sectional elevation view of the present invention, taken along line G—G of FIG. 6 illustrating the shade pleats and shade rail.

FIG. 7A is an exploded perspective view of the upper gear, chain and motor shaft components.

FIG. 8 is an enlarged, front elevation view illustrating the bottom left hand section of the present invention.

FIG. 8A is an exploded, side, elevation view of the lower gear attachment to the attachment arm.

DETAILED DESCRIPTION OF THE PREFERRED EMBODIMENT

Figure 1A:
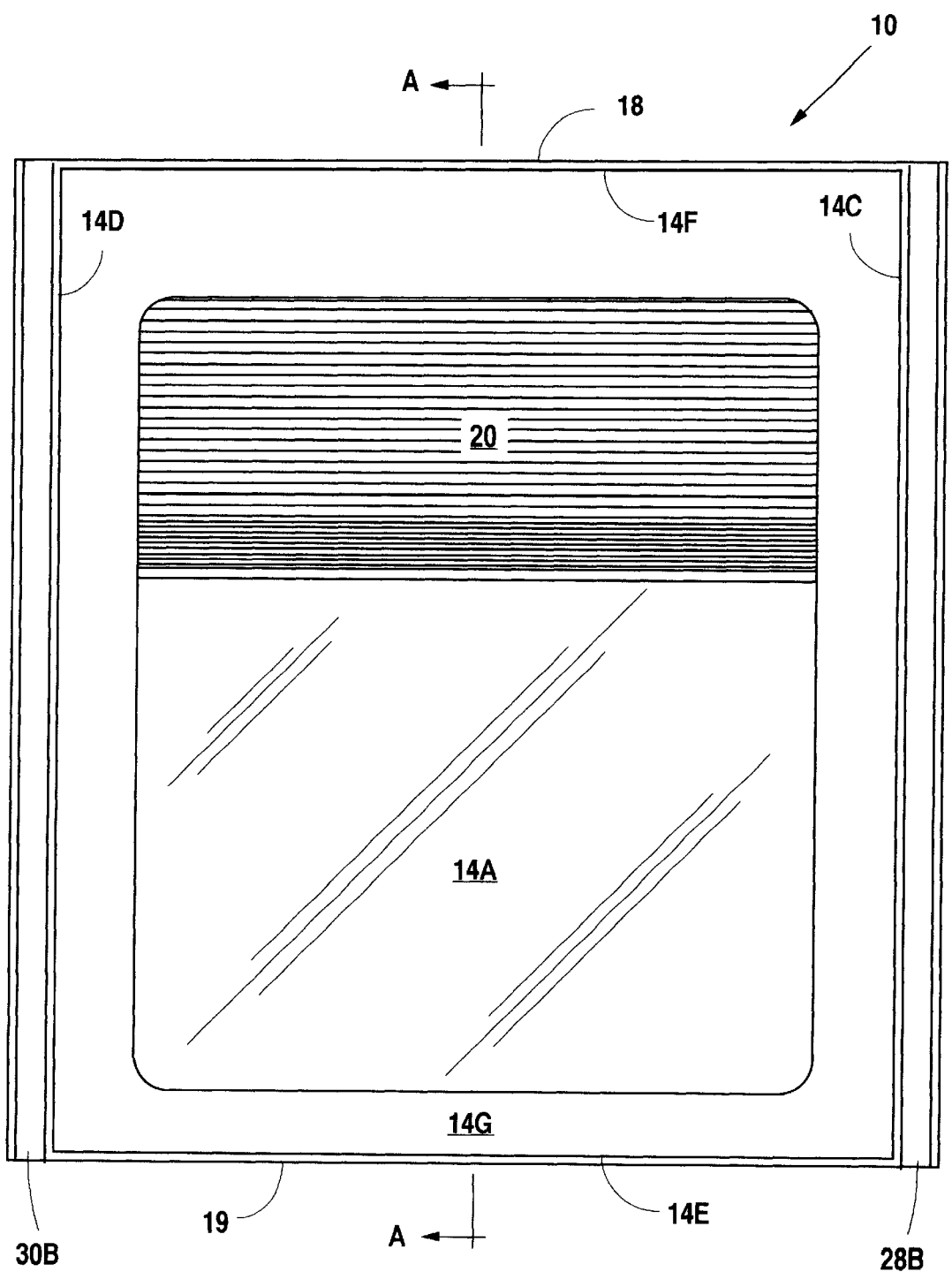
FIG. 1A is a front elevation view of the present invention.

The present invention is herein described as a modular window for use within an aircraft interior. Referring to FIG. 1A, a window (10) is shown with a collapsible shade (20) in the partially closed position. A lens (14A) is shown in the center of the window (10) surrounded by one of two masks (14G). FIG. 1A displays a fully assembled window, ready for placement into an aircraft interior wall (partition). An extended portion of the left (30B) and right (28B) shade frame rail may be fixed to the partition such that the window (10) is rigidly mounted within the aircraft. FIG. 1A further illustrates the top and bottom covers (18 and 19) as part of the window (10).

FIG. 1B illustrates the assembled window (10) as it is viewed from the top. The top cover (18) is horizontally attached to a top mounting rail (38) also shown in FIGS. 2 and 7 and described below. The top cover not only provides an attractive window cover but also prevents dirt and grime from collecting on the window (10).

FIG. 1C illustrates a more detailed view of the left side of the partially closed shade shown in FIG. 1A. The shade (20), the shade pleats (21), the shade bottom (20B) and the shade rail (22) are shown in FIG. 1C as well as the collapsible nature of the shade pleats (21). The shade (20) is typically formed from a plurality of equally sized hexagonal shaped pleats (21) composed of any suitable material. The opposing faces of each adjacent pleat is joined along a common axis (21A) as illustrated in FIG. 6B. The preferred embodiment of the present invention has a pleated shade (20) that is tubular in shape.

Each of the shade pleats (21) assumes an extended position (22E) when the shade is in the closed position. The shade (20) is closed when the moving shade rail (22) contacts a decorative trim member (52) attached to the bottom shade rail (26) as described below, illustrated in FIGS. 2 and 8, and located near the bottom of the shade frame (12). Each pleat (21) assumes a collapsed position (22C) when the shade (20) is in the open position. The shade is open when the moving shade rail (22) is in contact with the base portion (24A) of the top shade frame rail (24) described below, illustrated in FIGS. 2 and 7. If the shade (20) is partially closed as in FIG. 1A, the pleats near the top (20A) of the shade assume a more extended position (22E) while the pleats near the shade rail (22) assume a typically more collapsed position (22C).

The structural components of the window (10) include a shade frame (12), a first (14) and second (16) lens assembly, a shade (20), and means for moving the shade between a substantially open and substantially closed position. With the exception of the lens assemblies (14 and 16), the structural components of the window (10) as a whole are best illustrated by FIG. 2.

Figure 2:
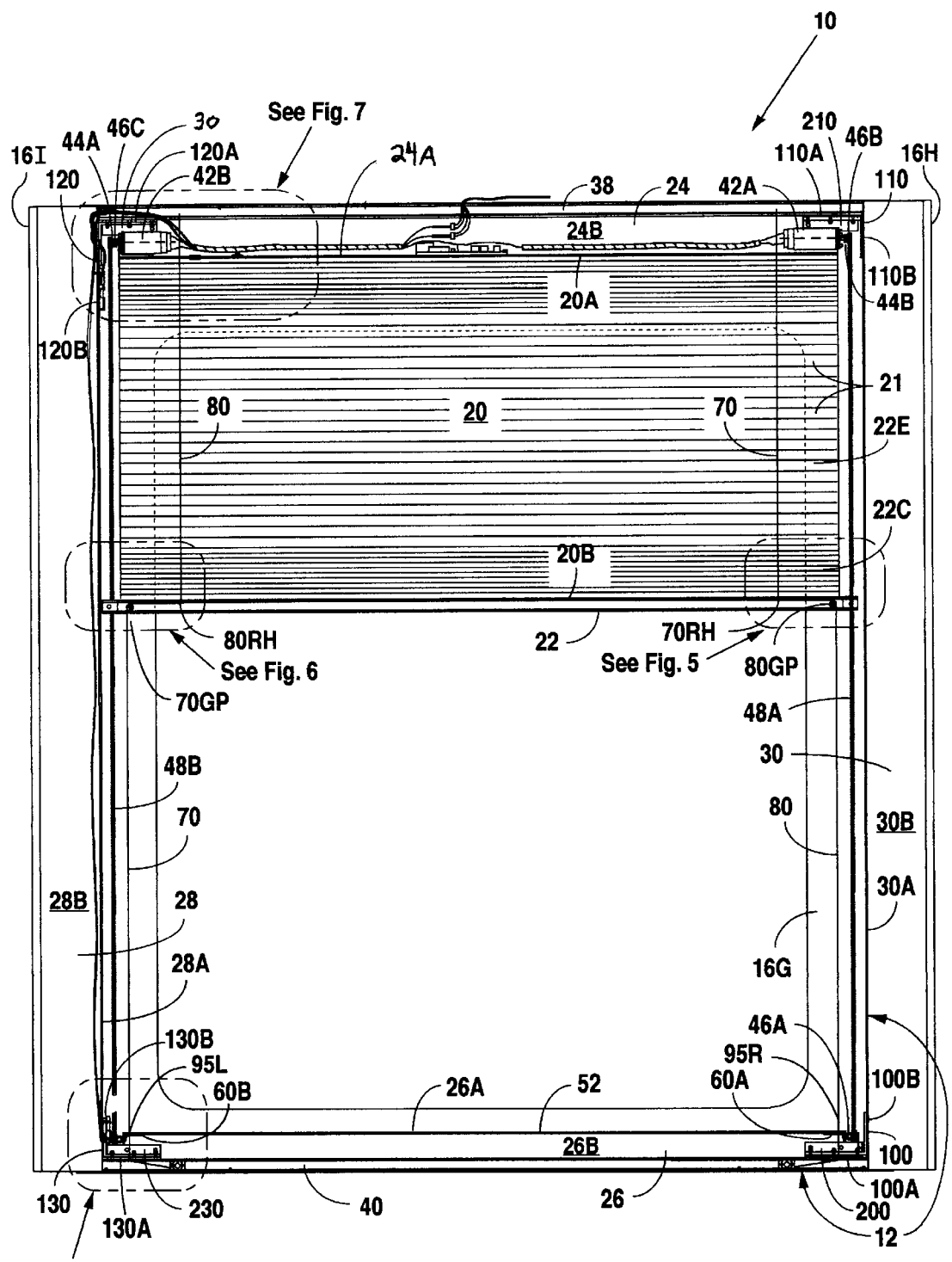
FIG. 2 is a front elevation view of the present invention shown without the lens mask
Figure 7:
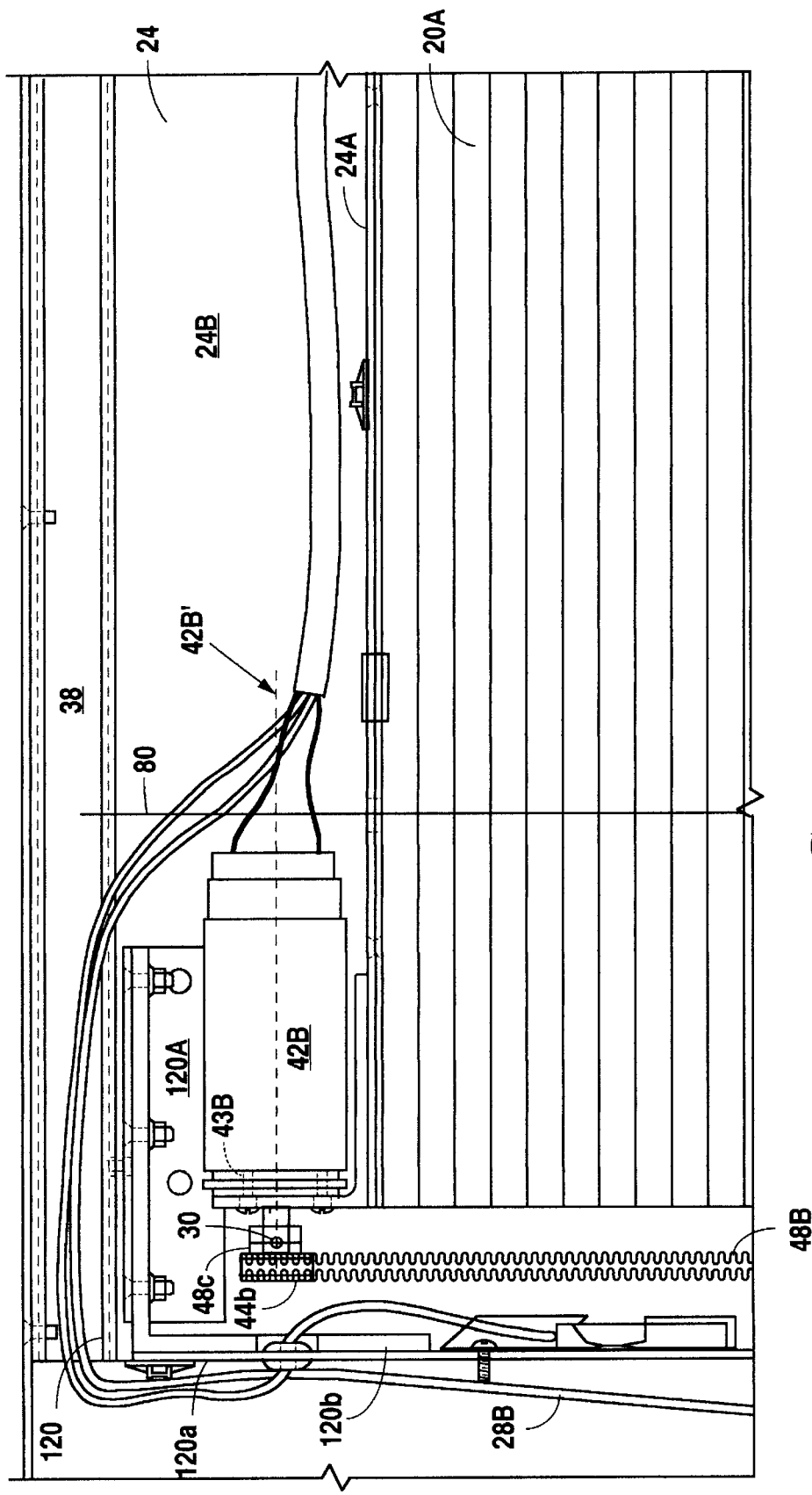
FIG. 7 is an enlarged, front elevation view of the upper left hand section of the present invention.

FIG. 2 illustrates the shade frame (12) which has a top shade frame rail (24) having an upright portion (24B) and a base portion (24A), a bottom shade frame rail (26) having an upright portion (26B) and a base portion (26A), a left side shade frame rail (28) having an extended portion (28B), a base portion (28A), and a right shade frame rail (30) having an extended portion (30B) and a base portion (30A), a top mounting rail (38), also shown in FIG. 7, and a bottom mounting rail (40), also shown in FIG. 8.

Further, the shade frame (12) has four corner braces (100, 110, 120, and 130) each with a horizontal portion (100A, 110A, 120A, and 130A respectively) and a vertical portion (100B, 110B, 120B, and 130B respectively). The corner braces provide structural support for the shade frame (12) and connect the top mounting rail (38) and the bottom mounting rail (40) to the left and right shade frame rails at their base portions (28A and 30A) as illustrated in FIG. 2.

FIGS. 2, 5, 6, 7 and 8 illustrate means for maintaining the horizontal alignment of the shade rail (22) during operation of the shade (20). These means include two alignment cords (70 and 80). These alignment cords function to provide horizontal alignment for the shade rail (22). The alignment cords (70 and 80) function as rigid stabilizers for the shade rail (22) by engaging the common axis (21A) of the shade rail (22) such that the shade rail is maintained in horizontal alignment with respect to the shade frame (12).

Figure 5:
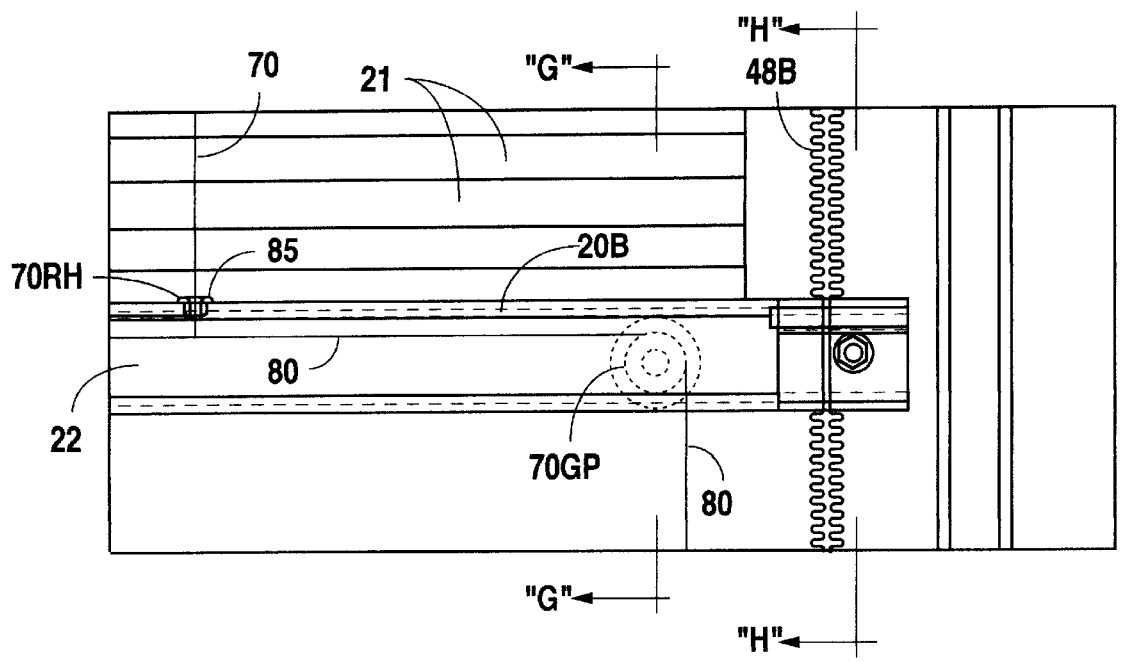
FIG. 5 is a right side, enlarged, detailed, elevation view of the present invention illustrating the shade frame rail attachment to the shade and chain.

The right alignment cord (80) is attached to the bottom mounting rail (40) at one end. The right cord extends vertically upward until it contacts the right guide pin (80GP) located within the shade rail (22). The right guide pin (80GP) redirects the right cord (80) such that it extends in a horizontal direction along the shade rail (22) as shown in FIG. 5. The right cord (80) is further redirected by the left redirection hole (80RH) such that the right cord (80) extends vertically upward away from the shade rail (22) and connects to the top mounting rail (38).

The left alignment cord (70) is attached to the bottom mounting rail (40) at one end. The left cord (70) extends vertically upward until it contacts the left guide pin (70GP) located within the shade rail (22). The left guide pin (70GP) redirects the left cord (70) such that it extends in a horizontal direction along the shade rail (22) as shown in FIG. 6. The left cord (70) is further redirected by the right redirection hole (70RH) such that the left cord (70) extends vertically upward away from the shade rail (22) and connects to the top mounting rail (38). The left and right alignment cords (70 and 80) may intersect each other as they extend horizontally along the shade rail (22).

The left and right guide pins (70GP and 80GP) redirect the alignment cords without excessive friction. The left and right guide pins of the preferred embodiment are two washers of different sizes, concentrically attached to one another and attached to the shade rail (22) as illustrated in FIGS. 2, 5, 6. A grommet (85) having curved surfaces is placed inside each redirection hole (70RH and 80RH). Each grommet acts as a shield against excessive friction between the alignment cords (70 and 80) and the redirection holes (70RH and 80RH). The curved surfaces of the grommet allow the alignment cords to smoothly engage the redirection holes. Additional guide pins (not shown) may also be placed adjacent to each redirection hole. Both the grommets (85) and the additional guide pins allow the cords to be gradually redirected such that friction is reduced between the cords (70 and 80) and the redirection holes (70RH and 80RH).

Figure 3:
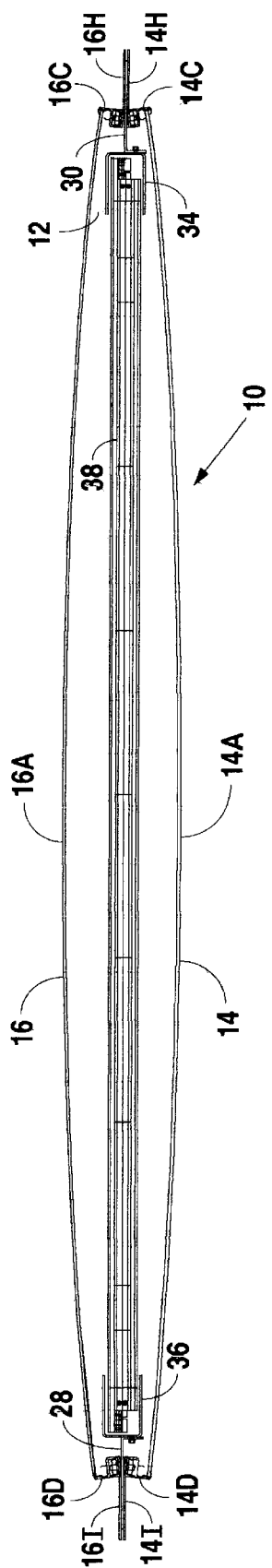
FIG. 3 is a top, elevation view of the present invention shown without the top plate attached.

FIG. 3 illustrates a top, cross sectional view of the window (10), displaying the double convex configuration of the lenses (14A and 16A) that is formed when each lens assembly (14 and 16) is mounted upon opposing sides of the left (28) and right (30) shade frame rails. FIG. 3 further illustrates how the shade (20) and the lens assemblies (14 and 16) are situated within the shade frame so as to provide an efficient use of valuable space. The location of the shade (20) between the lens assemblies (14 and 16) provides the shade with protection from dust, dirt, and impact with outside objects. This "shade between the lenses" configuration provides for easy maintenance and cleaning of the shade (20). In the preferred embodiment of the present invention, the first and second lenses (14A and 16A) are rectangular in shape and have the same dimensions. However, the first lens (14A) of the present invention may also have a length of about at least 40 inches, a width of about at least 30 inches, and an area of about at least 1200 square inches.

FIGS. 4, 4A, 4B, 4C, 3 and 1A illustrate the structure of the lens assemblies (14 and 16) as seen from above the window (10). Each of the first and second lens assemblies have a lens (14A and 16A), two side lens rails (14C and 14D, and 16C and 16D, respectively), each side lens rail having an outer lip (14C' and 14D', and 16C' and 16D', respectively), two lens frame mountings (14H and 16H, and 14I and 16I, respectively), two weather strippings (14J and 14K, and 16J and 16K, respectively), and two lens fasteners (14L and 14M, and 16L and 16M, respectively), a bottom lens rail (14E and 16E) having outer lips (14E' and 16E'), and two weather strippings (14Y and 16Y), a top lens rail (14F and 16F) having outer lips (14F' and 16F'), and two weather strippings (14Z and 16Z), and a lens mask (14G and 16G), The first (14A) and second lenses (16A) of the preferred embodiment of the present invention have the same dimensions and are rectangular in shape. The weather stripping is wedged between the mask (14G and 16G), lenses (14A and 16A) and the outer lips of the each side lens rail (14C and 14D, and 16C and 16D), each bottom lens rail (14E and 16E) and each top lens rail (14F and 16F) to press the mask and lens against each outer lip of each lens rail (14C' and 16C', 16C' and 16D', and 14F' and 16F', and 14E' and 16E' respectively).

The following discussion refers to the first lens assembly only and is intended as an example. It is to be understood that this discussion is equally applicable to the second lens assembly. Referring to FIGS. 4, 4A, 4B and 4C, to assemble and attach the first lens assembly (14) in a convex configuration, the lens (14A) is first perpendicularly placed into each of two side lens rails (14C and 14D) and into the top lens rail (14F) and the bottom lens rail (14E). Each lens rail (14C, 14D, 14E and 14F) has an outer lip (14C' and 14D', 14E', 14F', respectively) extending inwardly toward the center of the window (10). Weather stripping (14J and 14K and 14Y and 14Z) is placed against the lens mask (14G) and inside each of the lens rails (14C and 14D and 14E and 14F) such that the lens (14A) is secured between the lips (14C' and 14D' and 14E' and 14F') of the lens rails (14C and 14D and 14E and 14F) and the lens (14A). The weather stripping (14J and 14K and 14Y and 14Z) is placed around the perimeter of the lens mask (14G) to cushion the lens (14A) against impact, seal the perimeter of the lens to protect against dirt, and hold the lens in place so that the lens maintains a convex configuration. Each side lens rail (14C and 14D) has a lens fastener (14L and 14M) used to attach each side lens rail to each lens frame mounting (14H and 14I). The lens frame mounting is then attached by any suitable method to the extended portion of the side frame rails (28B and 30B) so that the lens (14A) is curved outwardly, having a convex configuration with respect to the shade (20).

Figure 4:
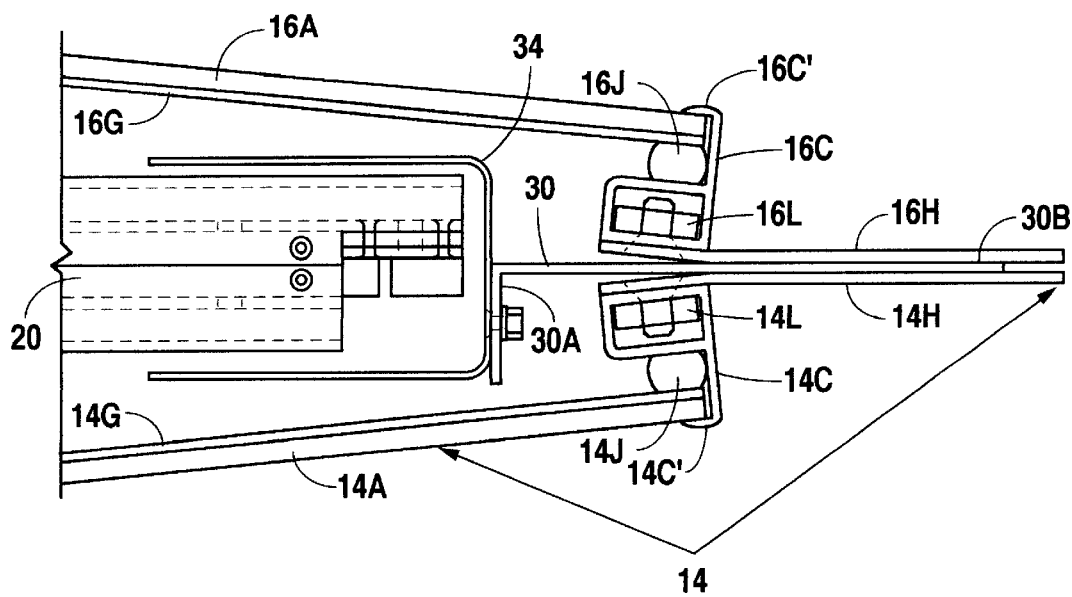
FIG. 4 is a right side, top elevation view of the present invention illustrating the shade frame, side shade frame track channels, first and second lens assemblies, and each lens.
Figure 4A:
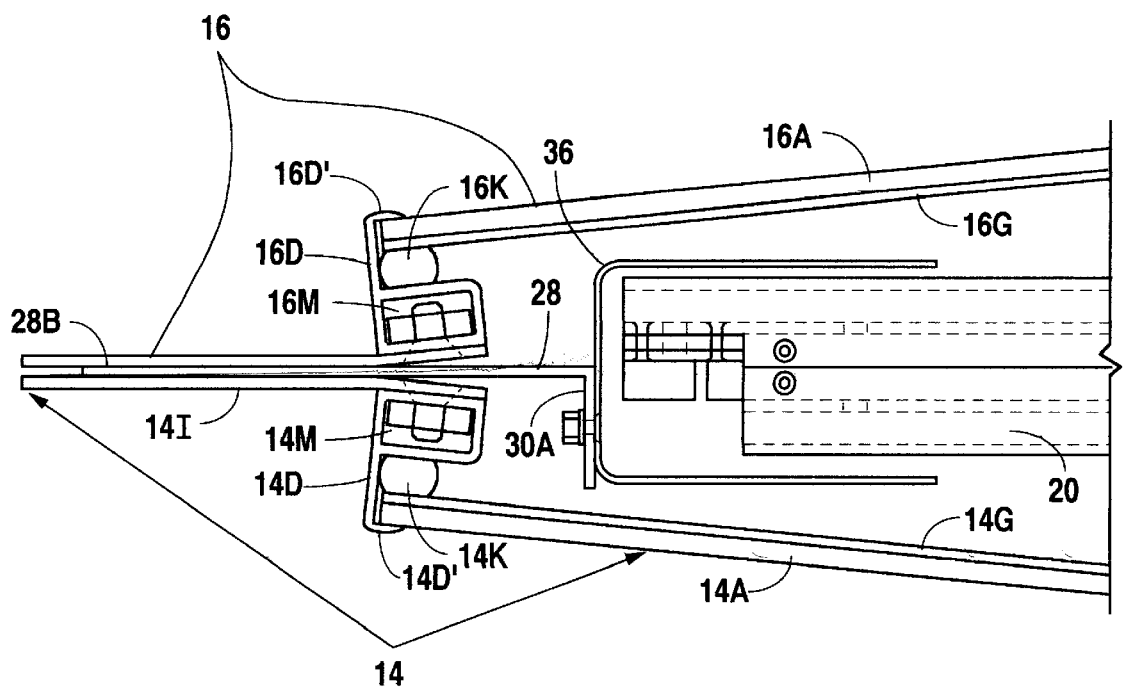
FIG. 4A is a left side, top elevation view of the present invention illustrating the shade frame, side shade track channels, first and second lens assemblies, and each lens.

The second lens assembly (16) is assembled in the same manner as the first lens assembly (14) except that the lens frame mountings (16H and 16I) of the second lens assembly (16) are attached to the extended portion of the left (28B) and right (30B) shade frame rails on a side opposite to the attachment of the first lens assembly (14). FIGS. 3, 4, and 4A illustrate this attachment to opposing sides of the extended portions of the shade frame rails (28B and 30B) such that double convex configuration is created by the lenses (14A and 16A).

Figure 4B:
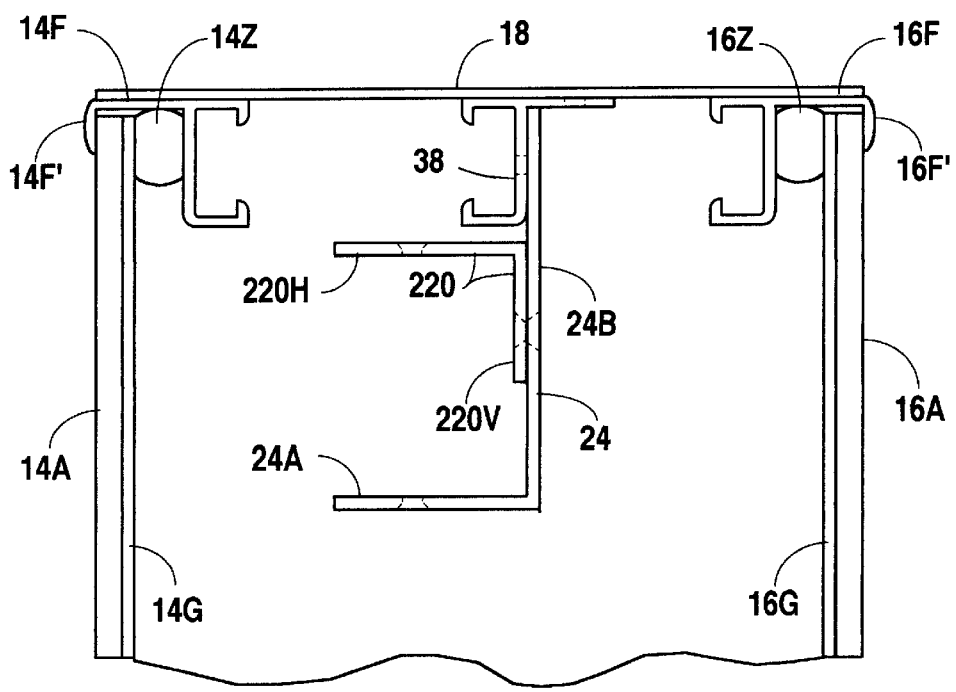
FIG. 4B is a top, side elevation view of the present invention taken along line A—A of FIG. 1A, illustrating the top shade frame rail, one of four support members, the top mounting rail, and the lenses mounted to the top lens rails.

FIG. 4B illustrates the attachment of the top mounting rail (38) to the top cover (18) such that the extended portion of the top shade frame rail (24B) attaches to the top mounting rail (38) and the vertical portion (220V) of one of four support members (220). Each support member (200, 210, 220, and 230) has a vertical portion (200V, 210V, 220V, 230V) and a horizontal portion (200H, 210H, 220H, 230H).

The support members provide structural stability for the window (10). This is accomplished by attaching the horizontal portion of each support member (200H, 210H, 220H, 230H) to each horizontal portion of each corner brace (100H, 110H, 120H, 130H) as illustrated in FIGS. 2, 7, and 8. The attachment of both lenses to the top cover (18) using the top lens rails (14F and 16F) and the use of weather stripping (14Z and 16Z) to secure and cushion each lens is illustrated by FIG. 4B.

Figure 4C:
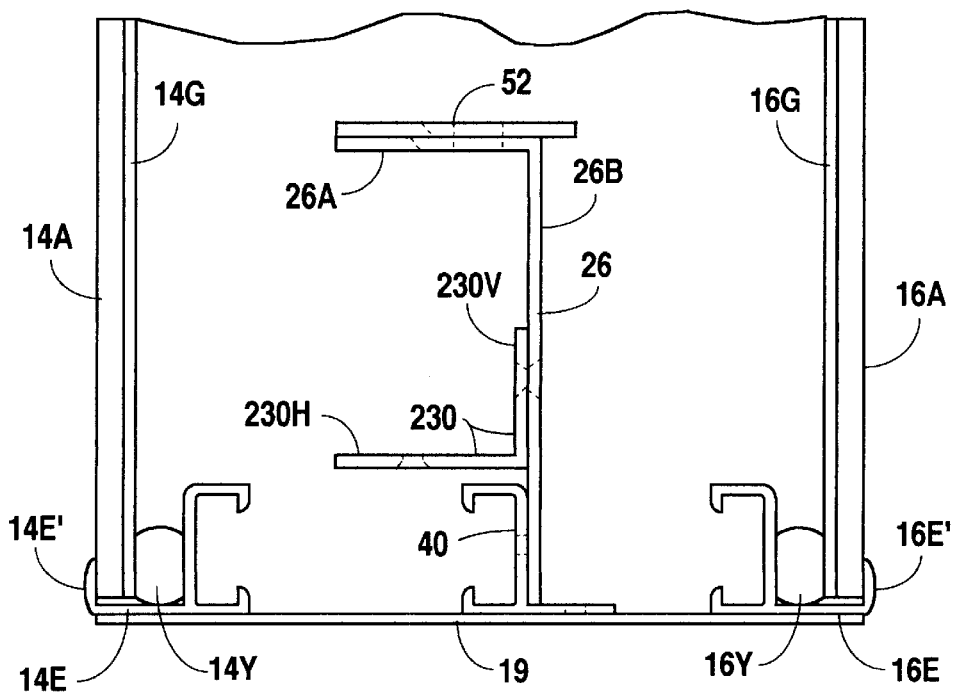
FIG. 4C is a bottom, side elevation view of the present invention taken along line A—A of FIG. 1A, illustrating the bottom shade frame rail, one of fur support members, the bottom mounting rail, and the lenses mounted to the bottom lens rails.

FIG. 4C illustrates the attachment of the bottom mounting rail (40) to the bottom cover (19) such that the extended portion of the bottom shade frame rail (26B) attaches to the bottom mounting rail (40) and the horizontal portion of one of four support members (230H). The attachment of both lenses to the bottom cover (19) using the bottom lens rails (14E and 16E) and the use of weather stripping (14Y and 16Y) to secure and cushion each lens is illustrated by FIG. 4C. The trim member (52) attaches to the base portion of the bottom shade frame rail (26A) and provides an aesthetic appearance for the window (10). The trim member (52) obscures the attachment arms (60), the bottom shade rail (26), the lower support members (200 and 230), and the lower corner braces (100 and 130) from view.

Figure 5A:
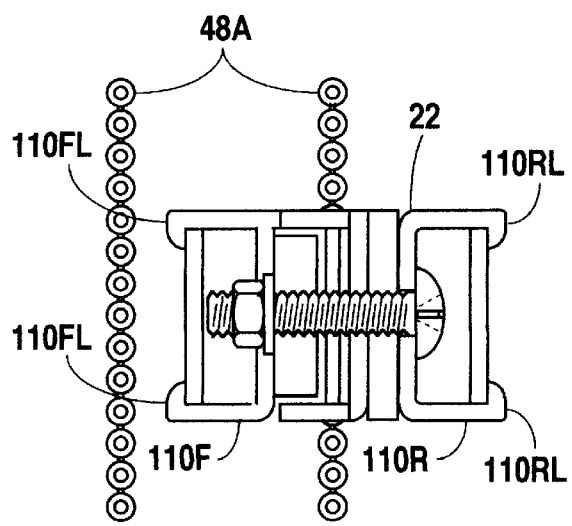
FIG. 5A is a side elevation, cross-sectional view of the present invention taken along line H—H of FIG. 5, illustrating the attachment of the shade frame rail to the chain.

FIG. 5 illustrates the right side of the shade rail (22), the bottom of the shade (20B) and the right chain (48A). The attachment of the shade rail to the left chain is described below. FIG. 5A illustrates the shade rail (22) attached to the right chain (48A) viewed from the right side and taken along the line H—H from FIG. 5. The attachment of the shade rail (22) to the right chain is described below.

FIG. 6 illustrates the left side of the shade rail (22), the bottom of the shade (20B) and the left chain (48B). The attachment of the shade rail (22) to the left chain is described below. FIG. 6A illustrates the shade rail (22) attached to the left chain (48B) of the present invention taken along the line F—F from FIG. 6. The attachment of the shade rail (22) to the left chain is described below.

FIG. 6B illustrates the shade rail (22) and the hexagonal shade pleats (21) of the preferred embodiment of the present invention taken along line G—G. The pleats are shown in a collapsed position (22C) and the common axis (21A) at which the pleats connect to one another is also displayed in FIG. 6B. Both sides of the shade (20) and the shade rail (22) are designed to be aesthetically pleasing to an observer.

The shade (20) has a first and a second outer surface (21E and 21F, respectively). These outer surfaces may be decorated to be similar in appearance such that the window (10) may be inserted into an interior wall of an aircraft without regard to which outer surface of the shade is visible to an observer. The first and/or second outer surfaces of the shade (20) can be decorated with textual or graphical information such as advertising, slogans, trademarks and/or a plurality of colors to provide an aesthetically pleasing shade. The shade (20) in a closed position also provides thermal and acoustical insulation for the passenger compartment.

In the preferred embodiment, the shade rail (22) has a center member (110C) and two side members attached to both sides of the center member. The center member is rectangular in shape and the side members have a J shape as illustrated in FIG. 6B. Front (110F) and rear (110R) side members are attached to the center member (110C) such that the open ends of the J shaped members (110F and 110R) face outwardly from the center member. The front and rear J shaped members (110F and 110R) of the shade rail (22) have edges for engaging decorative members. These decorative members can be decorated with textual or graphical information such as advertising, slogans, trademarks and/or a plurality of colors to provide an aesthetically pleasing shade rail (22). In the preferred embodiment, these decorative members are decorative strips (22F and 22R) sized for engaging the edges of the J shaped members (110F and 110R). The decorative strips (22F and 22R) may be decorated to be similar in appearance to each other such that the window (10) may be inserted into an interior wall of an aircraft without regard to which outer surface of the shade rail (22) is visible.

FIG. 7 illustrates the upper, left side of the window (10). FIG. 7 displays the top of the shade (20A), the top shade frame (24), the top mounting rail (38), one of four corner braces (120), the left motor (42B) with horizontal axis (42B'), a motor shaft (43B) attached to the left motor, one of two upper gears (46C), a pin (50), the left chain (48B), and the right alignment cord (80).

The window (10) shown in the Figures has at least one shade (20). Referring to FIGS. 2 and 7, the top of the shade (20A) is attached to the base portion of the top shade frame rail (24A) such that the shade (20) has a substantially vertical configuration within the window (10). In the preferred embodiment, the shade is composed of a plurality of equally sized hexagonal shaped pleats (21). A moveable shade rail (22) is attached to the bottom of the shade (20B) such that when the shade rail is moved, the shade pleats (21) assume either an extended position (22E) or a collapsed position (22C).

Means for moving the shade (20) may be electrical, mechanical, pneumatic, or hydraulic. FIG. 5 in U.S. Pat. No. 4,679,610, the specifications and drawings which are hereby incorporated by reference, illustrates the use of an actuator lever, a cable, and several pulleys as a mechanical means of moving the shade rail. This mechanical means used in the '610 patent may be used to raise and lower the shade found in the present invention. The preferred embodiment means for moving the shade (20) between a substantially open position and a substantially closed position is shown in the Figures. The present invention has two side shade track channels (34 and 36) that encompass the shade (20) as shown in FIGS. 3, 4 and 4A. These channels extend along the entire vertical length of the shade (20) to assist in providing lateral and vertical alignment for the shade (20) with respect to the shade frame no matter what flight conditions the aircraft may experience. The channels also act as a stabilizer to help prevent vibration of the shade (20) during flight.

Figure 9:
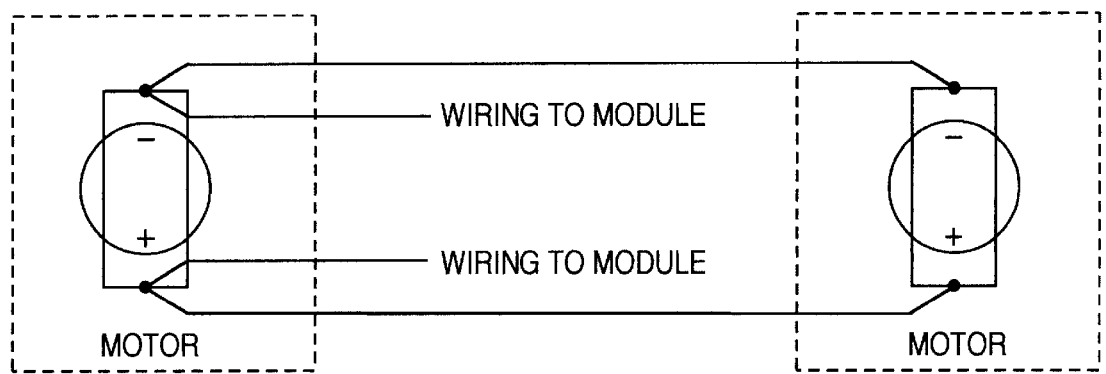
FIG. 9 is a diagram illustrating the reversed polarity wiring of the electrical motors.

The means for moving the shade (20) in the preferred embodiment are driving means having a right and a left motor (42A and 42B), each motor attached horizontally to the base portion of the top shade frame rail (24B) as illustrated in FIGS. 2 and 7. The motors of the preferred embodiment of the present invention are electrically driven and provide sufficient power to move the shade (20) between a substantially open and substantially closed position. Motor shafts (43A and 43B) are attached to each motor at the motors horizontal axis (42A' and 42B') such that a portion of the shaft extends outwardly from the motor. Each motor supplies power used to spin each motor shaft in a clockwise or counter-clockwise direction. The left and right motors (42B and 42A) are wired in series to provide for synchronized operation. Both motors operate at the same time, at the same speed, and turn their respective motor shafts (43A and 43B) in the same direction due to reversed polarity wiring as illustrated in FIG. 9.

Referring to FIG. 7A, each shaft is pinned (50) to an upper gear (46B and 46C) so that each upper gear will spin in concert with the motor shaft (43) it is attached to. FIG. 7A illustrates the manner is which each motor shaft (43) is placed within each upper gear (46) and is held in place by a pin (50).

Referring to FIGS. 2, 7 and 8, the means for moving the shade in the preferred embodiment includes two upper gears (46B and 46C), two lower gears (46A and 46D), two motors (42A and 42B), two motor shafts (43A and 43 B), two chains (48A and 48B), at least one pin (50), at least one housing (54A and 54B), at least one nut (56A and 56B), at least one washer (58A and 58B) at least one screw (62A and 62B) and a left (60B) and right attachment arm (60A).

FIG. 8 illustrates the lower, left side of the window (10). FIG. 8 displays one of four corner braces (130), the bottom shade frame rail (26), the left shade frame rail (28), the left alignment cord (70), one of two lens masks (14G), the bottom mounting rail (40), the trim member (52), the left attachment arm (60B), and the left chain (48B) attached to the left lower gear (46D).

The movement of the two chains (48A and 48B) are responsible for physically moving the shade (20) and, along with the alignment cords means (70 and 80), keeps the shade rail (22) level as the shade rail moves between an open and closed position via synchronized operation of the left and right motor. The right chain (48A) is routed over the right upper gear (46B) such that the chain extends downwardly toward the lower right gear (46A). The downwardly extended portion of the chain is then routed under the lower right gear (46A), the chain connecting the upper right gear (46B) and the lower right gear (46A).

Figure 10:
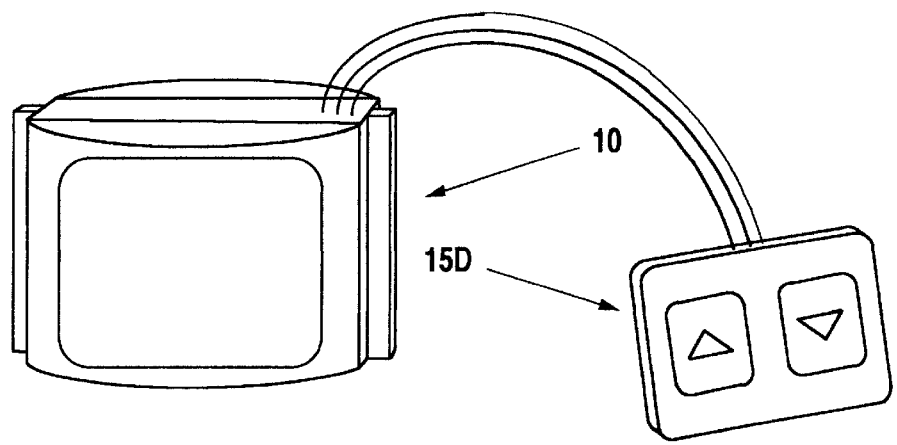
FIG. 10 is a perspective view of the present invention illustrating the switch means electrically connected to the window.

The left chain (48B) is routed between the upper (46C) and lower left gears (46D) in the same manner. The length of the chains is easily adjusted to fit whatever size of shade (20) is needed for the particular aircraft in use. Each lower gear (46A and 46D) is attached to the base portion (26A) of the bottom shade frame rail (26) as discussed below. The chains and the alignment cords engage the shade rail at its common axis to assist in balancing and stabilizing the shade (20). Means for moving the shade also include switch means. Referring to FIG. 10, the switch means of the preferred embodiment is a control panel (150) with up and down arrows. The switch means may be located at any convenient location including a location adjacent to the first and second lenses (14A and 16A). With a simple electrical connection between the switch means and the window (10), movement of the shade may be controlled from the cockpit of the aircraft or at any convenient location elsewhere within the cabin of the aircraft. The switch means can be any electrical, mechanical, pneumatic, or hydraulic control mechanism capable of directing the left and right motors to selectively engage and disengage such that the shade (20) may be moved with respect to the shade frame (12).

FIG. 8A illustrates how the housing (54) is placed inside of each lower gear (46A and 46D) and attached to an L-shaped attachment arm (60) with the use of a nut (56), a washer (58), and a screw (62). Each of two attachment arms (60A and 60B) have a vertical (60AV and 60BV) and horizontal portion (60AH and 60BH). Each horizontal portion of each attachment arm is attached to the base portion of the bottom shade frame rail (26A), the trim member (52) defines the extend to which the shade (20) can be extended downwardly. The base portion of the bottom shade frame rail (26A) and the horizontal portion of each attachment arm (60AH and 60BH) have lower guide holes (95L and 95R) as illustrated in FIGS. 2 and 8. The trim member (52) has dual through holes which allow the alignment cords (70 and 80)

to proceed downwardly such that each alignment cord may engage the bottom shade rail and attachment arm. The left lower guide hole (95L) engages the left alignment cord (70) and the right lower guide hole (95R) engages the right alignment cord (80). The lower guide holes (95L and 95R) ensure that each alignment cord will provide horizontal stability to the shade (20) when it is in a substantially closed position.

FIG. 9 illustrates the reversed polarity wiring used to provide synchronized operation of the left and right motors (42A and 42B). FIG. 10 illustrates the switch means of the preferred embodiment as a control panel (150) having up and down buttons and being electrically attached to the top of the window (10) by three wires. The preferred embodiment of the present invention uses up, down, and common wires to control the operation of the shade (20).

Although the preferred embodiment of the present invention has been described as a window (10) having two lenses (14A and 16A) forming a double convex configuration, it is anticipated that the present invention may use other configurations. Representative examples of anticipated configurations that may be used with the present invention include:
1) One convex lens and one flat lens forming a single convex configuration;
2) Two concave lenses forming a double concave configuration;
3) One concave lens and one flat lens forming a single concave configuration; and
4) One concave lens and one convex lens.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such description of the invention. It is therefore contemplated that the appended claims will cover such modifications, alternatives, and equivalents that fall within the true spirit and scope of the invention.

We claim:

1. A window for use within an aircraft interior, said window comprising:

at least one shade frame;

at least one shade having a top and bottom, said shade having a moveable shade rail attached to said bottom of said shade, said top of said shade attached to said shade frame;

a first and a second lens assembly, said first lens assembly having a first lens and said second lens assembly having a second lens, said first and second lens assemblies mountable to said shade frame such that said first and second lenses form a double convex configuration;

means for maintaining alignment of the shade rail, said means for maintaining alignment including shade track channels for engaging the shade rail; and means for moving said shade between a substantially open position and a substantially closed position;

wherein the shade frame includes a pair of side members and wherein the first and second lens assemblies engage the side members of the frame such that the first and second lenses bow outward from the side members as they move towards a central axis dividing the window into equal portions side to side.

2. The window of claim 1, wherein said first and second lenses have the same dimensions.

3. The window of claim 2, wherein said first lens has a length of at least 40 inches and a width of at least 30 inches.

4. The window of claim 2, wherein said first lens has an area of at least 1200 square inches.

5. The window of claim 1, wherein said first lens and said second lens are rectangular.

6. The window of claim 1, wherein said means for moving said shade is electrical, mechanical, pneumatic, or hydraulic.

7. The window of claim 1, wherein said shade is pleated.

8. The window of claim 7, wherein said shade is tubular.

9. The window of claim 1, wherein said means for moving said shade comprise drive means having two motors linked together capable of providing sufficient power to move said shade between a substantially open and a substantially closed position, said motors wired in series to provide synchronized movement of said shade rail.

10. The window of claim 1 wherein said means for maintaining alignment of said shade rail comprise a left and right alignment cord, said alignment cords engaging said shade rail at its longitudinal axis.

11. The window of claim 1, wherein said shade includes an outer surface, said outer surface of said shade having textual or graphical information thereon.

12. The window of claim 1, further comprising decorative members for enhancing the aesthetic appearance of said window.

13. The window of claim 12, wherein said shade rail comprises at least one center member and at least one side member, said side member having edges capable of engaging said decorative members.

14. The window of claim 13, wherein said decorative members of said shade rail comprises decorative strips, said decorative strips engaging said edges of said side members, said decorative strips may be decorated with textual or graphical information such that each decorative strip may have a similar appearance.

15. The window of claim 1, wherein said shade and said shade rail contain design coordinated textual or graphical information.

16. The window of claim 1, wherein said shade comprises a first outer surface and a second outer surface, said outer surfaces of said shade may be decorated with textual or graphical information such that each said outer surface has a similar appearance.

17. The window of claim 9, wherein said means for moving said shade comprise switch means located adjacent to said first and second lenses to selectively engage and disengage said motors such that said shade may be moved with respect to said shade frame.

18. The window of claim 9 wherein the drive means includes a pair of chains for linking each of the two motors to the shade rail.

19. The window of claim 1, wherein said window further comprises means to maintain horizontal alignment of said shade rail during operation of said shade.

\* \* \* \* \*